(12) United States Patent
Huang et al.

(10) Patent No.: US 7,651,023 B2
(45) Date of Patent: Jan. 26, 2010

(54) NICKEL-BASED BRAZE ALLOY COMPOSITIONS AND RELATED PROCESSES AND ARTICLES

(75) Inventors: Shyh-Chin Huang, Latham, NY (US); Liang Jiang, Guilderland, NY (US); Melvin Robert Jackson, Corea, ME (US); Laurent Cretegny, Niakayuna, NY (US); Charles Gitahi Mukira, Fairfax, VA (US)

(73) Assignee: General Electric Company, Niskayuna, NY (US)

( * ) Notice: Subject to any disclaimer, the term of this patent is extended or adjusted under 35 U.S.C. 154(b) by 242 days.

(21) Appl. No.: 11/751,944

(22) Filed: May 22, 2007

(65) Prior Publication Data

US 2008/0128475 A1 Jun. 5, 2008

Related U.S. Application Data

(62) Division of application No. 10/673,627, filed on Sep. 26, 2003, now abandoned.

(51) Int. Cl.
*B23K 31/02* (2006.01)

(52) U.S. Cl. .................... 228/245; 228/246; 228/248.1; 428/544

(58) Field of Classification Search ................ None
See application file for complete search history.

(56) References Cited

U.S. PATENT DOCUMENTS

| | | | |
|---|---|---|---|
| 3,053,652 A * | 9/1962 | Mobley et al. ............... 420/444 |
| 3,067,508 A * | 12/1962 | Kinelski ..................... 228/199 |
| 3,089,769 A | 5/1963 | Huschke Jr. et al. |
| 3,155,499 A * | 11/1964 | Mobley ....................... 420/588 |
| 4,009,027 A * | 2/1977 | Naidich et al. .............. 420/473 |
| 4,116,723 A | 9/1978 | Gell et al. |
| 4,149,881 A * | 4/1979 | D'Silva ....................... 420/588 |
| 4,160,854 A | 7/1979 | D'Silva |
| 4,169,744 A | 10/1979 | D'Silva |
| 4,396,577 A | 8/1983 | Smith, Jr. et al. |
| 4,414,178 A * | 11/1983 | Smith et al. ................. 420/444 |
| 4,508,257 A * | 4/1985 | Bose et al. ............. 228/262.31 |
| 4,587,097 A | 5/1986 | Rabinkin et al. |
| 4,719,081 A * | 1/1988 | Mizuhara .................... 420/463 |
| 4,746,379 A | 5/1988 | Rabinkin |
| 4,802,933 A | 2/1989 | Rabinkin |
| 4,830,934 A | 5/1989 | Ferrigno et al. |
| 4,901,904 A | 2/1990 | Tsuno |
| 4,903,890 A * | 2/1990 | Mizuhara ............... 228/262.31 |
| 5,399,313 A | 3/1995 | Ross et al. |
| 5,424,140 A | 6/1995 | Rabinkin |
| 5,523,170 A | 6/1996 | Budinger et al. |
| 5,542,993 A | 8/1996 | Rabinkin |
| 5,902,421 A | 5/1999 | Christy |
| 6,027,584 A | 2/2000 | Jackson et al. |
| 6,165,290 A | 12/2000 | Rabinskin |
| 6,177,046 B1 | 1/2001 | Simkovich et al. |
| 6,387,527 B1 * | 5/2002 | Hasz et al. .................. 428/472 |
| 6,454,885 B1 * | 9/2002 | Chesnes et al. ............. 148/528 |
| 6,464,128 B1 | 10/2002 | Messelling et al. |
| 6,468,669 B1 * | 10/2002 | Hasz et al. .................. 428/553 |
| 6,520,401 B1 | 2/2003 | Miglietti |
| 6,530,971 B1 | 3/2003 | Cohen et al. |
| 6,565,989 B2 * | 5/2003 | Jackson et al. .............. 428/662 |
| 2001/0006187 A1 * | 7/2001 | Hasz et al. .................. 228/119 |

FOREIGN PATENT DOCUMENTS

EP 0100919 A1 * 2/1984

OTHER PUBLICATIONS

SU318447, Abstract, Oct. 28, 1971.
SU529924, Abstract, Sep. 30, 1976.
JP62151291, Abstract, Jun. 7, 1987.
EP Search Report, EP04255752, Jan. 12, 2005.

* cited by examiner

*Primary Examiner*—Kiley Stoner
(74) *Attorney, Agent, or Firm*—Francis T. Coppa

(57) ABSTRACT

A nickel-based braze composition is described, containing nickel, palladium, and restricted amounts of boron and silicon. The composition can also contain tantalum, titanium, and zirconium, as well as aluminum, chromium, and cobalt. A method for joining two metal components, using the braze composition, is also described. The braze composition can also be used to fill cracks or other cavities in a component, e.g., a gas turbine part formed from a nickel-based superalloy. Articles of manufacture which contain the braze composition are also described.

13 Claims, No Drawings

NICKEL-BASED BRAZE ALLOY COMPOSITIONS AND RELATED PROCESSES AND ARTICLES

This application is divisional of Ser. No. 10/673,627, filed on Sep. 26, 2003, now abandoned.

BACKGROUND OF THE INVENTION

In a general sense, this invention relates to braze compositions. More specifically, it relates to braze materials suitable for repairing nickel-based superalloy articles, or for joining different sections of superalloy components.

Nickel- and cobalt-based superalloys are very important in a number of industrial applications. These applications often involve extreme operating conditions, wherein the superalloys may be exposed to high temperatures, e.g., above about 750° C. Moreover, the alloys may be subjected to repeated temperature cycling, e.g., exposure to high temperatures, followed by cooling to room temperature, and then followed by rapid re-heating. Gas turbine engines are a prime example of components subjected to such an environment.

It is frequently necessary to join various superalloy components together, and brazing techniques are often preferred to accomplish this objective. As an example in the case of power turbines, brazing may be used for a variety of critical components, such as turbine seals, first-stage turbine nozzle guide vanes, and turbine blades. These types of parts are often subjected to high temperatures and high-oxidation conditions in service.

A wide variety of braze compositions are commercially available, and can be adjusted to meet the requirements for the particular components being joined. As one example, U.S. Pat. No. 6,165,290 (Rabinkin) describes brazing materials based on cobalt-chromium-palladium-type alloys. The materials are said to be useful for brazing superalloy components which operate in a high temperature service environment. As another example, U.S. Pat. No. 4,414,178 (Smith, Jr. et al) describes nickel-palladium-chromium-boron brazing alloys. Those materials are useful for brazing in the 1800-2000° F. (982-1093° C.) temperature range, and exhibit good flow and "wettability" characteristics.

In addition to their use in the formation of joints, the braze compositions are often employed as repair materials. For example, they can be used to fill cracks, cavities, and other indentations within the surface of a superalloy component. U.S. Pat. No. 6,530,971 (Cohen et al) describes a nickel-based repair composition in the form of two powders. One of the powders includes, primarily, chromium, cobalt, titanium, aluminum, tungsten, and molybdenum, in addition to nickel. The other powder contains some of these elements, along with a significant amount of boron, which allows it to melt at a much lower temperature than the first powder. Combination of the two powders results in a braze slurry which effectively melts and fills a crack, but which does not interfere with surrounding features, such as turbine cooling holes.

Another repair process is described in U.S. Pat. No. 6,520,401 (Miglietti). The method involves filling a gap or crack in a metal component, using a liquid-phase diffusion bonding technique. The gap is first filled with an alloy powder having a composition similar to that of the component, and substantially free of melting point depressants. A braze which contains a melting point depressant is then applied over the powder in the gap. A first heating treatment is then employed to bring the temperature above the liquidus of the braze, but below the melting point of the powder. This allows the braze to infiltrate spaces within the powder. In a second heating stage, a temperature below the liquidus of the filler material is maintained, while diffusion of the melting point depressant occurs.

It is readily apparent that many different types of braze compositions are available, and are often used in repairing or joining superalloy components. While each of the commercial compositions may be very suitable for a number of applications, most of them still exhibit some deficiencies when they are used in certain situations. In the past, the deficiencies have often been of minimal importance, in view of the overall advantages of the braze materials. However, recent trends in various industrial segments have served to highlight some of those deficiencies.

In a very general sense, there are two primary requirements for the braze materials (whether used in a joining process or a repair process). First, they should be capable of being applied effectively to the component(s), e.g., with sufficient flow and wettability characteristics. Second, they must be capable of eventually solidifying into a joint or fill-material with adequate physical properties, such as strength, ductility, and oxidation resistance.

As technical requirements and other industrial needs increase, it is becoming more difficult to satisfy these general requirements for brazes. For example, many brazing operations for gas turbine components continue to require braze materials with demanding flow characteristics. The materials must also melt at temperatures low enough to protect the base material or workpiece from becoming overheated or otherwise damaged. It is therefore often necessary to incorporate significant amounts of metalloid elements such as boron and silicon into the braze compositions.

However, significant levels of boron and silicon can be detrimental to the final braze product. For example, these elements tend to form brittle, intermetallic phases in the braze micro structure. The Miglietti patent mentioned above alludes to this problem in the case of boron, e.g., describing the loss of ductility due to the presence of boride phases like $Ni_3B$.

Moreover, the Rabinkin patent describes other adverse effects caused by the use of boron and silicon metalloids. High-temperature components used in turbine parts, for example, often obtain their oxidation resistance via the formation of a dense alumina or alumina/titania protecting film on the surface of the component. If the components are subjected to brazing operations which contain the metalloids, the protecting film in the brazed region can be partially or completely damaged. As a result, the brazed interface can act as a conduit for oxygen penetration, leading to oxidation-attack of the entire part.

Continuing developments in industry have made the search for improved braze compositions more problematic. The advent of higher-strength and more highly-alloyed superalloy materials has created the need for brazes which are more closely matched with the superalloy. Specifically, the braze material often has to have a microstructure that is closely matched with the microstructure of the base alloy, while still exhibiting the high strength needed for many industrial applications.

Moreover, in the case of equipment like gas turbine engines, standard operating temperatures continue to be increased, to achieve improved fuel efficiency. This trend increases the propensity for corrosion and oxidative attack of the turbine components, i.e., the superalloy materials from which the engines are made. While steps are taken to improve the base alloys or otherwise protect them from this damage, steps also have to be taken to ensure the integrity of any brazed regions within the turbine engines.

It should thus be evident that new braze compositions for use with nickel-based superalloys would be very welcome in the art. The compositions should have a melting point low enough for many current brazing operations (e.g., for turbine engines). They should include only restricted amounts of elements such as boron and silicon, which can produce secondary phases in the final braze, or which can otherwise decrease braze integrity.

Moreover, the braze compositions should have flow and wettability characteristics which facilitate joint-forming or cavity-filling processes. The compositions should also be generally compatible with the component being brazed, e.g., in terms of microstructure. Furthermore, after solidifying, the braze compositions should exhibit the necessary characteristics for a given end use application, e.g., a desirable level of strength, ductility, and oxidation resistance.

BRIEF DESCRIPTION OF THE INVENTION

A nickel-based braze composition is described herein. The composition comprises:
about 10 to about 25 atom % palladium; and
about 0.1 atom % to about 5 atom % (total) of at least one element selected from the group consisting of boron and silicon;
with the balance comprising nickel. (As used in this description, "nickel-based" is meant to embrace compositions in which nickel is the predominant element. The compositions usually contain at least about 40 atom % nickel, along with one or more of the other elements described herein.).

Palladium is very effective as a melting point depressant for the composition, in addition to other advantages described below. Moreover, the inventors have discovered that this particular range of boron and/or silicon is high enough to enhance the flow and wettability of the braze, but low enough to prevent or minimize the occurrence of brittle secondary phases. In contrast, similar braze compositions employed in the past often utilized larger amounts of boron and silicon—usually greater than about 10 atom % (combined), based on the atomic weight of the entire braze composition. Specific levels of boron and silicon for especially preferred embodiments are also described below.

The braze composition usually includes additional elements, as described below. Examples include tantalum, titanium, and zirconium. Other examples include aluminum, chromium, and cobalt. Minor amounts of a variety of other elements are also described below, as are preferred levels for all of these constituents.

Another embodiment of the invention is directed to a method for joining two metal components formed of nickel-based alloys. (Sometimes, the term "substrate" is used herein in place of "component"). The method includes the following steps:

a) placing a joint-forming amount of the braze composition (described herein) between the metal components to be joined;

b) heating the braze composition to a brazing temperature sufficient to melt the composition, but not the adjacent components; and c) cooling the braze composition so that it re-solidifies and forms a joint between the components.

The braze composition can be used in many forms for this process, such as slurry, tape, or foil. The use of the particular braze composition described herein appears to enhance the brazing process, e.g., in terms of wetting and flow. Another desirable result is the formation of a strong braze segment which exhibits good oxidation- and corrosion-resistance. Another process which benefits from these compositions is also described herein, i.e., a process for filling a cavity in a superalloy-type component with the braze material. A common example of this process involves crack repair in gas turbine components.

Articles of manufacture constitute additional embodiments of this invention, and are described below. In brief, one article relates to a superalloy component joined to another component with the nickel-based braze composition described herein. Another article is directed to a superalloy component which includes a crack or other type of cavity, filled with the braze composition.

Further details regarding the various features of this invention are found in the remainder of the specification.

DETAILED DESCRIPTION OF THE INVENTION

As mentioned above, the nickel-based braze composition of this invention comprises about 10 to about 25 atom % palladium. Palladium is very effective as a melting point depressant for the composition. Its presence thus results in lower braze temperatures, which are highly desirable in many instances. Moreover, unlike melting point depressants such as boron and silicon, palladium exhibits a relatively high solubility in a nickel matrix. The high solubility prevents or minimizes the formation of brittle secondary phases in the nickel matrix.

The specific amount of palladium used for a particular braze composition will depend on various factors. They include: the composition of the workpiece(s) being brazed, the desired melting point for the composition; ductility requirements for the brazed segment, oxidation resistance requirements for the brazed segment; the type of brazing technique employed; and the identity of the other elements present in the braze (which will affect the solubility of the palladium in the nickel phase). Other considerations may also be taken into account, e.g., cost and availability. In some preferred embodiments, the level of palladium is in the range of about 12 atom % to about 20 atom %. In some especially preferred embodiments, the level of palladium is in the range of about 16 atom % to about 18 atom %.

The braze composition further comprises limited amounts of boron or silicon, or a combination of boron and silicon. The total amount of these elements should be at least about 0.1 atom %. It is believed that each of these elements may sometimes provide a degree of wettability and flow to the braze composition. These characteristics can be very helpful for ensuring that the braze material stays in intimate contact with the workpiece, and can readily fill cracks or other voids when necessary. Boron and silicon also help to reduce the melting point of the braze, as discussed previously.

However, it is important that the amount of boron and silicon be no greater than about 5 atom % (total). This limit on their presence substantially eliminates or minimizes the formation of secondary phases within the nickel microstructure, e.g., boride phases. In this manner, problems associated with those secondary phases are also eliminated or minimized, such as reduced ductility. High-temperature corrosion resistance and oxidation resistance, e.g., in the operating range of about 1800° F.-2100° F. (982° C.-1149° C.), can also be maintained.

It should be noted that the "5 atom %" ceiling on the inclusion of boron and silicon can be equated to a very low weight-percent ceiling. The following equation characterizes the approximate correspondence between atom % and weight % limits on boron and silicon:

$$C_{Si}+2.6(C_B) \le/= 2.3,$$

where $C_{Si}$ is weight % silicon, and $C_B$ is weight % boron. Several, non-limiting illustrations will be provided here, since the exact percentages will vary with the specific composition of the braze. Thus, for a nickel-based braze composition which also contains 16 atom % palladium, the "5 atom % ceiling" described above can be equated to approximately 0.9 weight % boron, when just one of boron and silicon is included. In those instances in which only silicon is present (with no boron), the "5 atom % ceiling" can be equated to approximately 2.3 weight % silicon. (These values would vary slightly with the specific level of palladium present, or if elements like chromium and aluminum are also present).

Another general illustration of the ceiling on boron and silicon in weight % can be provided, for a braze composition which contains equal amounts of the two elements, in terms of atomic %, e.g., 2.5 atom % B and 2.5 atom % Si. In that instance (for Ni/Pd/Si/B compositions), the "5 atom % ceiling" would be equated to approximately 0.42 weight % boron and 1.09 weight % silicon. (The equation above describing the weight percent limits results in a value of 2.2). An illustration can also be provided for that type of composition (2.5 atom % B/2.5 atom % Si), containing other elements within the scope of the present invention. For example, if the composition contained 16 atom % palladium, and also contained 10 atom % aluminum, 11 atom % chromium, and 5 atom % zirconium, the ceiling would be equated to approximately 0.44 weight % boron and 1.13 weight % silicon. (The equation above describing the weight percent limits results in a value of 2.3).

In some preferred embodiments, the amount of boron present is no greater than about 2 atom %, e.g., from about 0.1-2 atom %. Moreover, the amount of silicon present is often in the range of about 2 atom % to about 5 atom %, as long as the maximum, total limit of boron and silicon, mentioned above, is satisfied. (Thus, compositions which include selected amounts of silicon without any boron, or vice versa, are possible in some embodiments). In terms of relative amounts, silicon is sometimes preferred over boron, in view of the greater solubility of silicon within the nickel alloy.

The braze composition may also contain at least one element selected from the group consisting of tantalum, titanium, and zirconium ("Ta/Ti/Zr"). When used, these elements are typically present at a level (total) in the range of about 0.1 atom % to about 40 atom %. However, their relative amounts are to some degree dependent on the workpiece being brazed. (The desired liquidus temperature for the braze is also an important factor, as described below). In other words, the braze alloy composition is often formulated to be compatible with the composition of the superalloy of the workpiece. As an example, the workpiece may sometimes be a nickel-based superalloy, like Rene 80 or GTD™ 111, which contains relatively high levels of titanium, e.g., 5-6 atom %. In that instance, the braze composition might preferably contain about 1-7 atom % titanium. In contrast, a workpiece may be formed from an alloy like Rene N5, which does not contain any titanium, but contains about 2 atom % tantalum. In such a case, the braze composition might contain about 1-3 atom % tantalum.

In some preferred embodiments in which tantalum, titanium, and/or zirconium may be included in the braze alloy composition, they are present at a level (i.e., their total) in the range of about 1 atom % to about 15 atom %. The specific amounts of each element which are most appropriate for a given end use can be determined by considering the various factors discussed herein. In some especially preferred embodiments, these three elements are present at a level in the range of about 1 atom % to about 10 atom %.

In many embodiments, the braze composition includes at least one of aluminum or chromium. In addition to other advantages, both of these elements can enhance the oxidation resistance of the braze at high temperatures. When employed, the total amount of aluminum and chromium present is usually in the range of about 0.5 atom % to about 30 atom %.

As alluded to above, the composition of the substrate is an important factor in determining the appropriate amounts of braze constituents like aluminum and chromium. For example, if the substrate has a relatively high amount of aluminum, e.g., 12-13 atom %, the braze composition may include similar amounts of aluminum. Conversely, substrates with lower amounts of aluminum (e.g., 5-6 atom %) will often benefit from braze compositions with lower levels of aluminum.

Moreover, the braze composition should not typically function as a "sink" for aluminum. In other words, if the aluminum level in the braze is low (or zero), as compared to relatively large amounts of aluminum in the substrate, then aluminum from the substrate would tend to diffuse into the braze during service. This diffusion could adversely affect the properties of both the braze joint and the substrate.

In some preferred embodiments, the level of aluminum is in the range of about 2 atom % to about 16 atom %. In especially preferred embodiments, the level is about 4 atom % to about 15 atom %. In some preferred embodiments, the level of chromium is about 7 atom % to about 15 atom %. In especially preferred embodiments, the level is about 10 atom % to about 12 atom %.

Other factors are also involved in determining the most appropriate level of aluminum and chromium, as well as Ta/Ti/Zr. The desired liquidus temperature for the braze is very important. The term "liquidus temperature" is known in the art, and described, for example, in U.S. Pat. No. 4,414, 178, incorporated herein by reference. The "liquidus temperature" is understood to mean the temperature above which all of the metal in the braze is liquid.

Generally, the brazing temperature of an alloy is selected to be approximately 50° F. (28° C.) higher than the liquidus temperature. It is usually desirable that the braze be fully liquid at a temperature where the alloy in the workpiece remains fully solid. As an example in the case of superalloy components being joined, the desired brazing temperature should be below the solidus of the component alloys, but above the liquidus of the braze composition. (The size of the substrate, e.g., the workpiece being brazed, is also a factor here. A greater degree of segregation will occur in larger workpieces. This will often necessitate a lower brazing temperature, to avoid melting of the workpiece).

Strong, heavily-alloyed materials like Rene N5 contain a substantial amount of refractory elements, and thus exhibit a relatively high melting point. In that instance, the liquidus temperature is also relatively high. Thus, in some preferred embodiments, the amount of tantalum, titanium, zirconium, aluminum and chromium (when one or more of these elements are used) in the braze composition is sufficient to achieve a braze liquidus of no greater than about 1230° C., e.g., about 1200° C. to about 1230° C.

Other types of substrate alloys are designed to have less refractory content, with greater amounts of elements such as titanium. These types of substrates (e.g., Rene 80 and GTD™

111) would therefore exhibit lower melting points than the Rene N5-type materials. In this instance, the amount of tantalum, titanium, zirconium, aluminum and chromium, when used in the braze composition, is sufficient to achieve a braze liquidus of about 1170° C. to about 1200° C.

The braze composition may contain a variety of other elements as well. The selection of particular elements will depend in part on the various factors noted above, such as requirements for strength, ductility, and oxidation resistance. Economic considerations (e.g., the cost of braze constituents), as well as material availability, are also considerations.

As an example, many of the braze compositions may include cobalt. Cobalt is especially desirable when the substrate also contains cobalt. (Cobalt is often used to improve microstructural stability). As in the case of other braze constituents, the amount of cobalt which is present will also depend in part on the amount of cobalt in the substrate. When used, cobalt is typically present at a level in the range of about 1 atom % to about 15 atom %. In preferred embodiments, the level is in the range of about 3 atom % to about 10 atom %.

Other elements which are sometimes included in the braze composition include carbon, molybdenum, tungsten, rhenium, and/or iron. The factors described previously provide guidance as to the inclusion of these elements, and their relative amounts. Usually, each element is optionally present at a level no greater than about 3 atom %. Exemplary ranges for these elements are as follows:

TABLE 1

| Carbon | About 0.1 atom % to about 1.0 atom % |
|---|---|
| Molybdenum | About 0.1 atom % to about 3.0 atom % |
| Tungsten | About 0.1 atom % to about 2.0 atom % |
| Rhenium | About 0.1 atom % to about 2.0 atom % |
| Iron | About 0.1 atom % to about 3.0 atom % |

Table 2 lists some of the more specific compositions which fall within the scope of this invention, and are preferred in some embodiments. Each composition comprises the constituents listed, and all quantities are in atom percent, based on 100 atom % for the entire composition:

TABLE 2

| | | |
|---|---|---|
| (I) | Palladium | about 12% to about 20% |
| | Boron/Silicon* | about 0.1% to about 5% |
| | Aluminum | about 2% to about 16% |
| | Chromium | about 7% to about 15% |
| | Nickel | balance |
| (II) | Palladium | about 12% to about 20% |
| | Boron/Silicon* | about 0.1% to about 5% |
| | Aluminum | about 2% to about 16% |
| | Chromium | about 7% to about 15% |
| | Titanium | about 3% to about 10% |
| | Nickel | balance |
| (III) | Palladium | about 12% to about 20% |
| | Boron/Silicon* | about 0.1% to about 5% |
| | Aluminum | about 2% to about 16% |
| | Chromium | about 7% to about 15% |
| | Titanium | about 3% to about 10% |
| | Tantalum | about 1% to about 3% |
| | Zirconium | about 0.5% to about 3% |
| | Nickel | balance |
| (IV) | Palladium | about 12% to about 20% |
| | Boron/Silicon* | about 0.1% to about 5% |
| | Aluminum | about 2% to about 16% |
| | Chromium | about 7% to about 15% |
| | Titanium | about 3% to about 10% |
| | Cobalt | about 1% to about 15% |
| | Nickel | balance |
| (V) | Palladium | about 12% to about 20% |
| | Boron | about 0.1% to about 2% |

TABLE 2-continued

| | | |
|---|---|---|
| | Aluminum | about 2% to about 16% |
| | Chromium | about 7% to about 15% |
| | Titanium | about 3% to about 10% |
| | Tantalum | about 1% to about 3% |
| | Zirconium | about 0.5% to about 3% |
| | Nickel | balance |
| (VI) | Palladium | about 12% to about 20% |
| | Silicon | about 2% to about 5% |
| | Aluminum | about 2% to about 16% |
| | Chromium | about 7% to about 15% |
| | Titanium | about 3% to about 10% |
| | Tantalum | about 1% to about 3% |
| | Zirconium | about 0.5% to about 3% |
| | Nickel | balance |
| (VII) | Palladium | about 10% to about 15% |
| | Silicon | about 3% to about 5% |
| | Titanium | about 15% to about 28% |
| | Zirconium | about 10% to about 18% |
| | Nickel | balance |
| (VIII) | Palladium | about 12% to about 20% |
| | Boron/Silicon* | about 0.1% to about 5% |
| | Aluminum | about 2% to about 16% |
| | Chromium | about 7% to about 15% |
| | Tantalum | about 0.5% to about 2.5% |
| | Nickel | balance |

*At least one of boron and silicon - total level.

In some additional embodiments, each of the compositions I to VIII may further comprise relatively minor amounts of other elements. Most were mentioned above, e.g., carbon, molybdenum, tungsten, rhenium, and iron. Each of these elements, if included, is usually present in the range of about 0.1 atom % to about 3 atom %.

As mentioned above, the nickel-based braze composition can be used in a variety of techniques for joining various components (e.g., turbine engine parts), or for repairing sections of a component, e.g., crack repair. In general, brazing techniques are well-known in the art. Non-limiting examples include the Smith patent referenced above, as well as U.S. Pat. Nos. 6,520,401; 6,464,128; 6,200,690; and 6,165,290, which are also incorporated herein by reference. Typical brazing techniques include activated diffusion healing (ADH), partitioned alloy component healing (PACH), and transient liquid phase bonding (TLP). The braze composition is usually in the form of a slurry, tape, foil, wire, powder, or putty. Some of these brazing forms are discussed in more detail below. Other brazing details are also known in the art, e.g., cleaning steps to remove oxides or contaminants before brazing.

Slurries are frequently used for brazing. Details regarding their contents and preparation are also described in many sources. Examples are U.S. Pat. No. 4,325,754 and U.S. patent application Ser. No. 10/256,602 (W. Hasz et al, filed Sep. 30, 2002), both incorporated herein by reference.

In addition to the braze constituents discussed above, slurries usually contain at least one binder and a solvent (or multiple solvents). The solvents can be either aqueous or organic. The binders are often water-based materials such as polyethylene oxide and various acrylics; or solvent-based materials. The slurry can contain a variety of other conventional additives, such as dispersants, wetting agents, deflocculants, stabilizers, anti-settling agents, thickening agents, plasticizers, emollients, lubricants, surfactants, anti-foam agents, and curing modifiers. The slurry can be deposited on the substrate (or between two substrates being joined) by any convenient technique, in one or more layers. Prior to being heated to a brazing temperature, the slurry is sometimes heat-treated by any suitable means, to remove some or all of its volatile components.

As mentioned above, the braze composition can alternatively be utilized in the form of a tape. For example, the slurry described above can be tape-cast, to produce a free-standing sheet or tape. Tape-casting methods are known in the art. Usually, the slurry is tape-cast onto a removable support sheet, e.g., a plastic sheet formed of a material such as Mylar®. Substantially all of the volatile material in the slurry is then allowed to evaporate. The removable support sheet is then detached from the green braze tape. The resulting tape usually has a thickness in the range of about 1 micron to about 500 microns.

The free-standing, green braze tape can then be cut to a size appropriate for the particular brazing technique, and applied to the location where brazing will take place. Various techniques can be used to temporarily hold the tape in place, prior to the actual brazing or fusing step. Examples include the use of adhesives, spot-welds, or tack-welds. For a joining operation, the green braze tape can be sandwiched between the two components, and then heat-treated under the conditions mentioned below.

The use of the braze composition in the form of a metal sheet or "foil" is also known in the art. As one example, the braze material, in the form of a powder, can be first combined with a binder and/or with additional metal powder which is similar in composition to the substrate. The combined material is then deposited onto a support sheet, e.g., by a thermal spray technique such as HVOF (high velocity oxy-fuel). The support sheet is then removed, leaving the desired metal foil. Foils of this type can also be prepared by other methods as well, e.g., an amorphous metal ribbon technique. A "pre-forming" technique could also be used, wherein the previously-described green tape is partially fired (off the part), to form a metallic sheet. Prior to the actual brazing step, the foil can be temporarily held in place on the substrate, as described above.

Brazing is carried out at a temperature sufficient to melt the braze composition, but not the surrounding metal component (or components). Various factors are considered in determining the most appropriate brazing temperature; some were described previously. They include: the specific braze constituents; the liquidus and solidus of the braze and of the components being joined; the composition and size of the components; the form in which the braze is used; and the type of heating technique employed. In a typical industrial application, e.g., for gas turbine components, brazing temperatures are usually in the range of about 1150° C. to about 1260° C.

When possible, brazing is often carried out in a vacuum furnace. The amount of vacuum will depend in part on the composition of the braze alloy. Usually, the vacuum will be in the range of about $10^{-1}$ torr to about $10^{-8}$ torr. Brazing times for the nickel-based braze compositions will depend on many of the factors described previously, but usually range from about 10 minutes to about 1 hour. Very often, brazing is followed by one or more diffusion steps (at the brazing temperature or lower) which function, in part, to homogenize the braze microstructure.

As mentioned above, the braze composition is often used to fill a cavity in a superalloy component, e.g., a gas turbine engine part. The cavity—often in the form of a crack—may be present, for example, in a turbine blade, vane, or compressor case. It can occur for a variety of reasons, e.g., thermal fatigue, pitting because of corrosion or oxidation; and denting from impact with foreign objects. In order to prolong the useful life of the component, filling of the cavity is often necessary.

The cavity can first be filled with the braze composition described herein. Any conventional technique may be used to fill the cavity, depending in part on the form of braze, e.g., slurry, tape, and the like. The braze is then heated to a temperature sufficient to cause it to melt, while not melting any surrounding material of the component. The liquid-like material can then flow and completely fill the cavity. When the material cools, it re-solidifies within the cavity. (It should be understood that "cooling" of the braze composition is meant to include passive cooling, or specific cooling steps, e.g., vacuum cooling, blowing with an inert gas, and the like).

As alluded to above, some embodiments involve the use of two powders which, when combined, function as a braze admixture or "braze system". One of these powders is the braze composition described above, and may be referred to as simply the "braze" for the sake of clarity. The second powder usually has a composition similar to that of the base alloy which is being joined or repaired, and can be referred to as the "metal or alloy powder" or "metal/alloy powder". The metal/alloy powder is often substantially free of boron and silicon, and contains less than about 2 atom % palladium. The melting point of the metal/alloy powder is often about 50° C. degrees higher than the melting point of the braze. An example of a metal/alloy powder which can be used with the braze composition of the present invention is one based on the GTD™ 111 alloy, mentioned previously. Such a powder contains, in atom %: 58.9% Ni, 6.4% Al, 9.3% Co, 15.6% Cr, 0.9% Mo, 1.0% Ta, 6% Ti, 1.3% W, and 0.5% C, along with trace amounts of other elements.

The braze and metal/alloy powder can be combined with a binder and other additives described above, forming a viscous paste. The paste can be applied to the substrate, e.g., a crack, and then heated as described previously. Use of this pre-mixed brazing system has advantages in some applications, e.g., in filling large cracks or other cavities. (The nearby presence of the metal/alloy powder particles, relative to the braze particles, can often allow for greater diffusion of the boron and/or silicon out of the braze and into the metal/alloy). As another alternative, the paste can be used in the form of a tape or foil, prepared, for example, by one of the techniques mentioned above.

The two powders, i.e., the braze and the metal/alloy powder, can also be applied to the substrate separately, and then combined during one or more heating steps. A non-limiting example of such a technique (sometimes referred to as "diffusion bonding" or "liquid phase diffusion bonding" is provided in U.S. Pat. No. 6,520,401 (Miglietti), discussed above. As an illustration, a crack or other type of cavity is first filled with the metal/alloy powder. The braze of this invention (containing melting point depressants) is then applied over the metal/alloy powder. In a first heating stage, the two powders are heated to a temperature above the liquidus of the braze, and below the melting point of the metal/alloy powder. This temperature is maintained for a period sufficient for the braze to infiltrate the spaces within the metal powder. In a subsequent heating stage, a temperature below the liquidus of the combined braze and powder is maintained while substantial diffusion of the melting point depressants (palladium with boron and/or silicon) occurs. In this manner, the cavity can be completely and effectively filled with a braze system having the physical and chemical properties described herein.

It should be evident from the teachings set forth above that another embodiment of this invention is directed to various articles of manufacture. As an example, one article is a superalloy component which might include a crack or other type of cavity. The term "superalloy" is intended to embrace complex nickel-based alloys which include one or more other elements, such as rhenium, aluminum, tungsten, molybdenum, titanium, or iron.) Superalloys are described in various references, such as U.S. Pat. Nos. 5,399,313 and 4,116,723, both incorporated herein by reference. The cavity of the component is filled with one of the braze compositions described herein.

Another article is directed to a superalloy component joined to another component with the nickel-based braze composition described herein. There are many examples where braze joints of this type are used. One non-limiting example involves the nozzle section (e.g., the nozzle cover plate) of a gas turbine engine. Very often, the end plates for the nozzle are brazed to the main body of the nozzle, forming a cooling passage. Use of the braze composition of this invention is believed to result in a joint which has the characteristics required for strenuous, high-heat employment of the nozzle section.

Having thus described the invention in rather full detail, it will be understood that such detail need not be strictly followed. Thus, various changes and modifications may suggest themselves to one skilled in the art. All of these changes and modifications fall within the scope of the present invention as defined by the attached claims. All of the patents, articles, and texts which are mentioned above are incorporated herein by reference.

What is claimed:

1. A method for joining two metal components formed of nickel-based alloys, comprising the following steps:
    a) placing a joint-forming amount of a braze composition between the metal components which have been positioned in a close-fitting arrangement, wherein the braze composition comprises:
    about 10 to about 20 atom % palladium; and
    about 0.1 atom % to about 5 atom % (total) of at least one element selected from the group consisting of boron and silicon;
    about 2 atom % to about 16 atom % aluminum;
    about 7 atom % to about 15 atom % chromium;
    with the balance comprising nickel;
    b) heating the braze composition to a brazing temperature sufficient to melt the composition but not the metal components; and
    c) cooling the braze composition so that it re-solidifies and forms a joint between the components.

2. The method of claim 1, wherein the braze composition further comprises at least one constituent selected from the group consisting of binders, solvents, dispersants, wetting agents, deflocculants, stabilizers, anti-settling agents, thickening agents, plasticizers, emollients, lubricants, surfactants, anti-foam agents, and curing modifiers.

3. The method of claim 1, wherein the braze composition is in the form of a tape, foil, wire, powder, slurry, or putty.

4. The method of claim 1, wherein step (b) is carried out in a vacuum furnace.

5. The method of claim 1, wherein the braze composition further comprises at least one element selected from the group consisting of tantalum, titanium, and zirconium, wherein the total amount of tantalum, titanium and zirconium present is in the range of about 0.1 atom % to about 40 atom %.

6. A method for filling a cavity in a component formed of a nickel-based superalloy material, comprising the following steps:
    (I) incorporating a braze composition into the cavity, wherein the braze composition is a first metal powder which comprises:
    about 10 to about 20 atom % palladium; and
    about 0.1 atom % to about 5 atom % (total) of at least one element selected from the group consisting of boron and silicon;
    about 2 atom % to about 16 atom % aluminum;
    about 7 atom % to about 15 atom % chromium;
    with the balance comprising nickel;
    (II) heating the braze composition to a brazing temperature sufficient to melt the composition and to cause it to flow and completely fill the cavity, while not melting any surrounding material of the component; and
    (III) cooling the braze composition so that it re-solidifies within the cavity.

7. The method of claim 6, wherein the cavity is a crack, and the braze composition is in the form of a slurry.

8. The method of claim 6, wherein the braze composition further comprises at least one element selected from the group consisting of tantalum, titanium, and zirconium, wherein the total amount of tantalum, titanium and zirconium present is in the range of about 0.1 atom % to about 40 atom %.

9. The method of claim 6, wherein the braze composition further comprises at least one element selected from the group consisting of aluminum and chromium.

10. The method of claim 6, wherein the braze composition further comprises a second metal powder, having a melting point different from that of the first metal powder.

11. A superalloy component joined to another metal component with a nickel-based braze composition, consisting essentially of:
    about 10 to about 20 atom % palladium; and
    about 0.1 atom % to about 5 atom % (total) of at least one element selected from the group consisting of boron and silicon;
    about 2 atom % to about 16 atom % aluminum;
    about 7 atom % to about 15 atom % chromium;
    with the balance comprising nickel.

12. A superalloy article having at least one cavity filled with a nickel-based braze composition, consisting essentially of:
    about 10 to about 20 atom % palladium;
    about 0.1 atom % to about 5 atom % (total) of at least one element selected from the group consisting of boron and silicon;
    about 2 atom % to about 16 atom % aluminum; and
    about 7 atom % to about 15 atom % chromium;
    with the balance comprising nickel.

13. A method for joining two metal components formed of nickel-based alloys, comprising the following steps:
    a) placing a joint-forming amount of a braze composition between the metal components which have been positioned in a closed-fitting arrangement, wherein the braze composition comprises:
    about 10 to about 20 atom % palladium;
    about 0.1 atom % to about 5 atom % silicon;
    about 2 atom % to about 16 atom % aluminum; and
    about 7 atom % to about 15 atom % chromium;
    with the balance comprising nickel
    b) heating the braze composition to a brazing temperature sufficient to melt the composition but not the metal components; and
    c) cooling the braze composition so that it re-solidifies and forms a joint between the components.

* * * * *